(12) United States Patent
Strunk et al.

(10) Patent No.: US 10,702,935 B2
(45) Date of Patent: Jul. 7, 2020

(54) BEVEL GEAR FLANK SURFACE STRUCTURE SHIFT

(71) Applicant: THE GLEASON WORKS, Rochester, NY (US)

(72) Inventors: Sebastian Strunk, Rochester, NY (US); Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 86 days.

(21) Appl. No.: 15/572,520

(22) PCT Filed: May 26, 2016

(86) PCT No.: PCT/US2016/034205
§ 371 (c)(1),
(2) Date: Nov. 8, 2017

(87) PCT Pub. No.: WO2016/191509
PCT Pub. Date: Dec. 1, 2016

(65) Prior Publication Data
US 2018/0126471 A1    May 10, 2018

Related U.S. Application Data

(60) Provisional application No. 62/167,459, filed on May 28, 2015.

(51) Int. Cl.
*B23F 1/02* (2006.01)
*B23F 5/02* (2006.01)
(Continued)

(52) U.S. Cl.
CPC .................. *B23F 1/02* (2013.01); *B23F 5/02* (2013.01); *B23F 5/163* (2013.01); *B23F 19/005* (2013.01); *B23F 19/06* (2013.01)

(58) Field of Classification Search
CPC .. B24B 1/00; B23F 1/02; B23F 19/005; B23F 5/163; B23F 5/02; B23F 19/06
(Continued)

(56) References Cited

U.S. PATENT DOCUMENTS 2,207,438 A * 7/1940 Miller ..................... B23F 19/00
29/90.6
5,140,781 A * 8/1992 Marsh ....................... B23F 1/02
264/162
(Continued)

FOREIGN PATENT DOCUMENTS

EP    1600236 A1    11/2005
JP    48-88588 A    11/1973

OTHER PUBLICATIONS

Schneider, Yu. G., "Regularization of Microgeometry of Part Surfaces", Soviet Engineering Research, New York, vol. 11, No. 5, 1991, pp. 12-16.
(Continued)

*Primary Examiner* — Robert A Rose
(74) *Attorney, Agent, or Firm* — Robert L. McDowell

(57) ABSTRACT

A process for improving the excitation behavior of a ground bevel gear set by altering the surface structure of a gear set member from tooth slot to tooth slot (Teeth 1-3). The method comprises shifting the roll-positions in a way that not every facet or flat (F) is positioned the same way on each flank (2) and/or changing the distances of the roll angle along a tooth slot (delta RPj) whereby flats are spaced unequally (i.e. varying widths) along the tooth. One or more additional processes for altering the surface structure may be included.

13 Claims, 10 Drawing Sheets

(51) Int. Cl.
*B23F 5/16* (2006.01)
*B23F 19/00* (2006.01)
*B23F 19/06* (2006.01)

(58) Field of Classification Search
USPC .......................................... 451/47, 5, 8, 9, 10
See application file for complete search history.

(56) References Cited

U.S. PATENT DOCUMENTS

| | | |
|---|---|---|
| 6,481,307 B1 | 11/2002 | Klingelnberg |
| 6,712,566 B2 | 3/2004 | Stadtfeld et al. |
| 7,462,092 B2 | 12/2008 | Stadtfeld et al. |

OTHER PUBLICATIONS

International Search Report and Written Opinion for PCT/US2016/034205, ISA/EPO, dated Aug. 18, 2016, 13 pages.

\* cited by examiner

BEVEL GEAR FLANK SURFACE STRUCTURE SHIFT

FIELD OF THE INVENTION

The invention relates to bevel gears and in particular to a process which improves the vibration and sound excitation behavior of ground bevel gears.

BACKGROUND OF THE INVENTION

Ground bevel and hypoid gears have a designed motion error that defines parts of their noise vibration harshness (NVH) behavior. In addition to other dynamic effects, the surface structure has an effect on the excitation behavior. This surface structure is defined via a hard finishing process. Very common hard finishing processes are, for example, lapping, grinding and skiving. Grinding shows the advantage of high repeatability, defined flank forms with closed loop corrections and subsequently have very low reject rates. However it is known that, for example, lapped gear sets show, at least at low loads, a lower excitation level including the lower as well as the higher mesh harmonics.

In producing gears by a generating process, a tool and a workpiece are rolled together in a predetermined relative rolling motion, known as a generating roll, as though the workpiece were rotating in mesh with a theoretical generating gear, the teeth of the theoretical generating gear being represented by the stock removing surfaces of the tool. The profile shape of the tooth is formed (i.e. generated) by the relative motion of the tool and workpiece during the generating roll. Usually, the tool is a cup-shaped grinding wheel or a cutting tool comprising a disc-shaped cutter head with a plurality of cutting blades projecting from a face of the cutter head.

Generating grinding for bevel ring gears or pinions presents the grinding wheel as a tooth of the theoretical generating gear, while the workpiece rolls on the generating gear tooth to finish the profile and lead of the workpiece tooth surface. During the generating roll, a computer controlled (e.g. CNC) free form machine, such as disclosed in U.S. Pat. No. 6,712,566 (incorporated herein by reference) for example, changes its axes positions in several hundred steps with each step represented by up to three linear axis positions (e.g. X, Y, Z) and up to three rotational axis positions (e.g. tool, workpiece, pivot) of the machine. In generating grinding of bevel and hypoid gears, five axes are commonly required (the grinding wheel rotates independently), which change their axis positions several hundred times during the rolling process for each tooth surface.

FIG. 1 illustrates an example of the contact between a grinding wheel and a tooth surface 2 in a generating process. As mentioned above, during the generating process, the positions of the machine axes are usually changed several hundred times during grinding of a tooth surface as the grinding wheel is traversed across the tooth surface during the generating roll. Each positional change may be represented by a contact line $L_c$ with the lines of contact being oriented at an inclination angle $\alpha_r$. The number of contact lines m (i.e. the number of axes positional changes) per each generating roll position may vary but for discussion purposes only, 300 contact lines will be referenced although it should be understood that fewer or more lines of contact may be utilized. The area F between successive lines of contact shall be referred to as a "flat" or "facet". Thus, for a generating roll consisting of 300 lines of contact, 299 flats will be generated.

In practice, the flats of ground gears are extremely small (referred to as micro flats) and are usually not visible to the eye due to the grinding wheel surface effectively being a continuum surface with no discreet and defined cutting surfaces as would be found with a cutting tool having cutter blades. In comparison, flats of gear tooth flanks produced by cutting, particularly rough cut gears, may be more pronounced and visible. It can therefore be appreciated that for a certain machining process, machining flats specific to the particular process (e.g. grinding, cutting) are produced on a gear tooth flank. The existence of flats and the knowledge that different machining processes produce respective types of flats (i.e. machining-specific flats) are, per se, known to the skilled artisan.

As descried, the motions between tool and work gear are typically derived from a rolling process of the work gear and the generating gear. With the more recent transformation of the rolling motion into a five or six axis free-form machine (such as, for example, U.S. Pat. No. 6,712,566), the motions of the single axes are basically third order functions with a dominating first order content. The coordinates for all axes are written into an axis position table that is read in by the machine controller of the free-form machine.

The generation of a ground pinion is realized via the rolling motion of a cup-shaped grinding wheel that follows a path given by the axis position table. Some excitations in ground gear sets are caused by the production process itself. The machine follows each line in this axis position table and interpolates between the lines. At low roll rates, a high number of lines are given in the axis position table and the machine can follow these lines very accurately because of the slow motions and their continuous functions. Also with low roll rates, the machine inertia contributes to smooth transitions between the lines in the axis position table.

At high roll rates, fewer lines are generated in the axis position table. The machine has to follow these lines at a higher speed while the grinding wheel revolutions per minute (RPM), determined from a given surface speed, remains the same. This results in fewer revolutions of the grinding wheel between the axis positions of the part program, creating a surface pattern similar to generating flats formed during a cutting process. The minimal time increment between two axis positions is limited by the controller specific block time, which presents the upper limit of axis positions for each given roll rate.

The above described effects can basically be summarized as influences where machine motions itself in combination with resulting machine vibrations and imperfect grinding wheel roundness during a standard grinding process will lead to a distinct surface structure with facets parallel to the contacting lines. These lines including their waviness are crossed while rolling along the path of contact and lead to excitations when rolling the bevel gear set. Depending on the roll rate and machine dynamics, these effects can be found at lower mesh harmonics (fast roll-rates) or at higher mesh harmonics (slow roll-rates).

In the process to finish bevel gears to produce a diffuse surface structure according to U.S. Pat. No. 7,462,092, the disclosure of which is hereby incorporated by reference, it is possible to influence each axis position in each line of the axis position table by small predetermined or random amounts. In previous research, this process was used to introduce a predictable and/or random surface structure on the tooth flank to influence the NVH-behavior of the ground gear set. In the standard grinding process the same axis position table is used for every tooth slot, leading to a similar appearance of the surface structure for every flank if the process affected wear of the grinding wheel from the first to last slot is neglected.

Additionally, it is known to utilize the principles of modulation (such as frequency modulation for example) in the field of mechanical engineering to influence excitation behavior. For example, in fans (U.S. Pat. No. 3,006,604), torque converters (US 2011/0289909) and turbines (U.S. Pat. No. 1,502,903), unequal spacing of the blades leads to a change in excitation behavior. FIG. 2 shows the exaggerated example of a cooling fan with unequally spaced blades. The results of these spacing variations lower the peak harmonics (e.g. blade impact frequency of a fan) and introduce additional sidebands. The energy of the peak harmonic is distributed from the peak to the sidebands leading to a lowering of the peak harmonic. This idea applied to the spacing of gear teeth has been part of several research projects but showed only limited success.

The above stated properties of the standard grinding process including the discussed process to produce a diffuse surface structure repeat precisely from one tooth to the next and may lead to excitations of discrete harmonics that correlate to the machined existing surface structure including the surface waviness, leading to measured NVH-behaviors which may not be acceptable in the final application of many ground gear sets.

SUMMARY OF THE INVENTION

The inventive process improves the excitation behavior of a ground bevel gear set by altering the surface structure of a gear set member from tooth slot to tooth slot. The method comprises shifting the roll-positions in a way that not every facet (i.e. flat) is positioned the same way on each tooth flank and/or changing the distances of the roll angle along a tooth slot whereby flats are spaced unequally (i.e. varying widths) along the tooth. One or more additional processes for altering the surface structure may be included.

DETAILED DESCRIPTION OF THE PREFERRED EMBODIMENT

Figure 1:
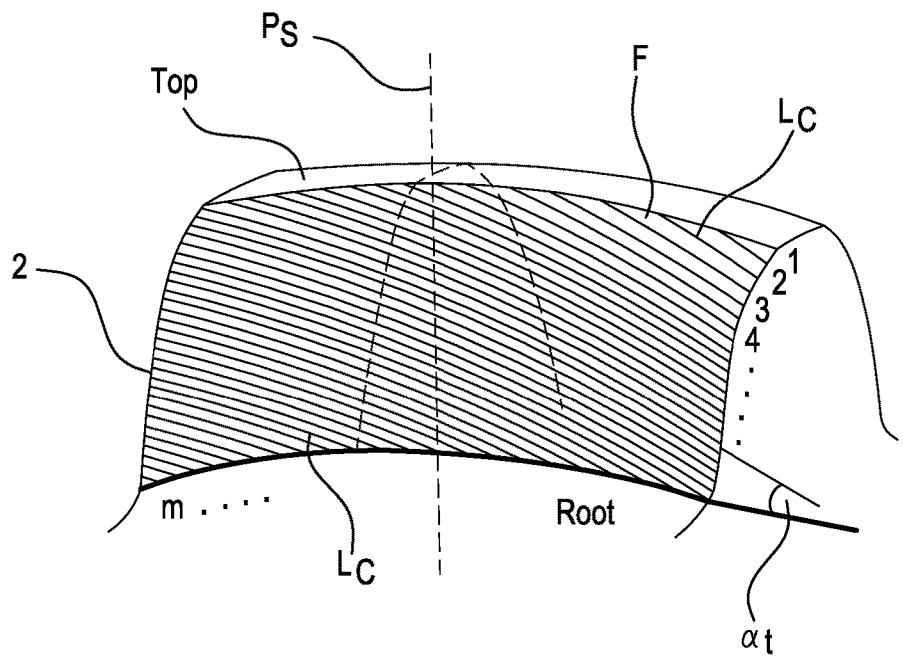
FIG. 1 illustrates an example of the contact between a grinding wheel and a tooth surface in a generating process.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways.

Also, it is understood that the phraseology and terminology used herein is for the purposes of description and should not be regarded as limiting. The use of "including", "having" and "comprising" and variations thereof herein is meant to encompass the items listed thereafter and equivalents thereof as well as additional items.

The details of the invention will now be discussed with reference to the accompanying drawings which illustrate the invention by way of example only. In the drawings, similar features or components will be referred to by like reference numbers.

Figure 2:
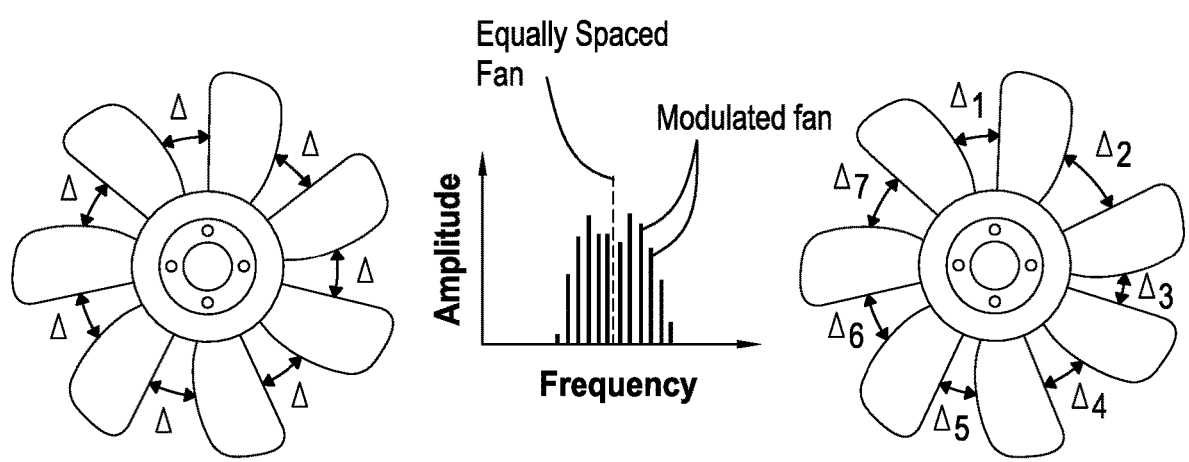
FIG. 2 shows the exaggerated example of a cooling fan with unequally spaced blades.

As discussed above, it is known to utilize the principles of modulation (such as frequency modulation for example) in the field of mechanical engineering to influence excitation behavior. FIG. 2 shows the exaggerated example of a cooling fan with unequally spaced blades. The left side of FIG. 2 shows an equally spaced cooling fan introducing one dominating blade frequency, leading to a disturbing noise. The cooling fan shown on the right side of FIG. 2 has unequally spaced blades, where the spacing follows a sinusoidal function which is predetermined utilizing Bessel-functions for example. The frequency diagram in the center of FIG. 2 shows a solid vertical line representing the excitation amplitude of the first blade impact frequency of the equally spaced cooling fan to the left, which leads to a disturbing pure tone event. The dashed vertical lines in the frequency diagram show the excitation amplitudes of the blade impact frequency of the unequally spaced fan to the right, which delivers a variety of frequencies (sidebands) and with significantly lowered amplitudes. The application of this idea to research involving gear tooth spacing has yielded only limited success.

The inventive process improves the excitation behavior of a ground bevel gear set by altering the surface structure of a generated member from tooth slot to tooth slot. This process may be carried out simultaneously with other methods such as the previously discussed process to produce a diffuse surface structure but it may also be applied independent of any additional process. Instead of using the same axis position table for every ground tooth slot, which is the state of the art, every tooth slot receives changes to its specific axis position table. The changes from tooth slot to tooth slot are calculated to address any objectionable harmonic excitation. For this reason, the objectionable harmonic excitation is predictably addressable based on a closed loop iteration calibrating the chosen process parameters.

Figure 3:
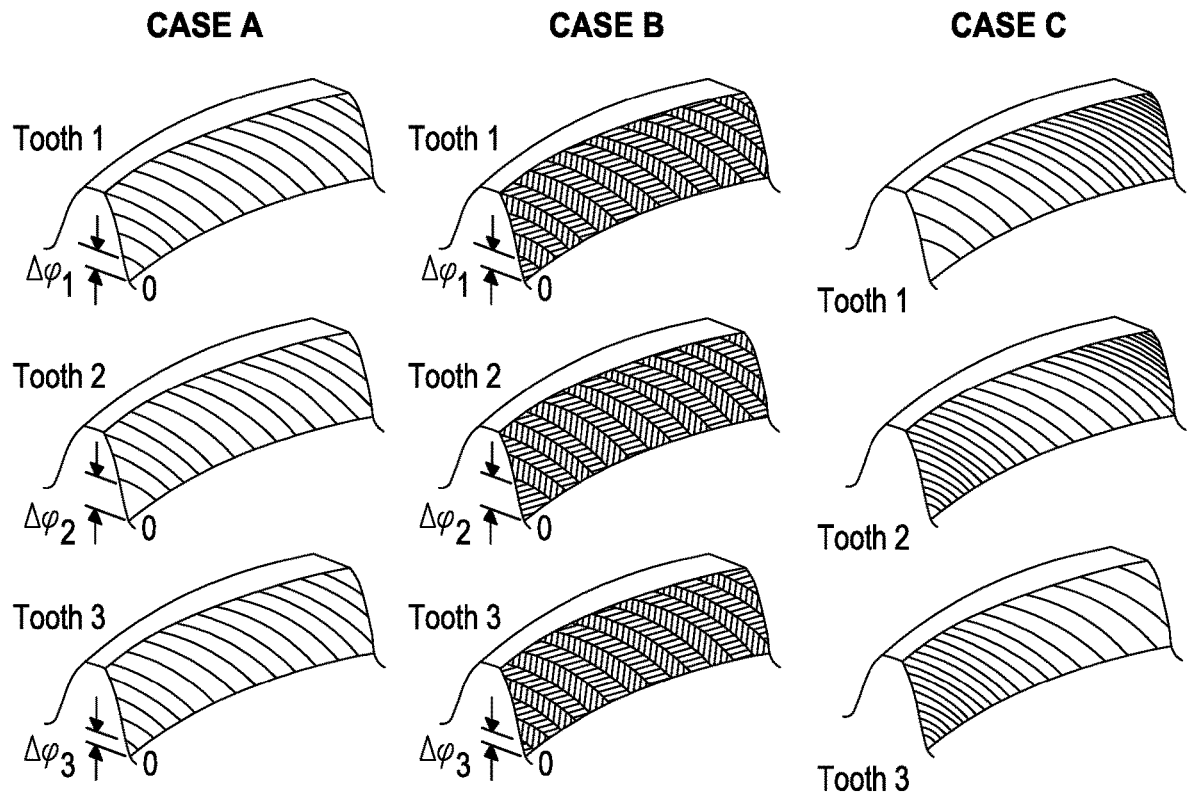
FIG. 3 shows three examples of how the excitation behavior of ground bevel gear sets may be changed.

With the present invention, the excitation behavior of ground bevel gear sets may be changed, for example, according to the following cases which are illustrated in FIG. 3:

Case A—Shifting the roll-positions in a way that not every facet (i.e. flat) is positioned the same way on each flank, without any additional process. The structure on the flanks of the gear teeth (Teeth 1-3 shown as an example) is shifted with an amount, $\Delta\varphi_i$ resulting from the shift in roll position, $\Delta RP_j$, for every flank. Case A utilizes only roll position shifts. The shift follows a predetermined function (e.g. by linear, sinusoidal or higher order functions). The distance from flat to flat is the same on every flank.

Case B—Shifting the roll-positions in a way that not every flat is positioned the same way on each flank (Teeth 1-3 shown as an example) combined with an additional process such as to produce a diffuse surface structure, as described in U.S. Pat. No. 7,462,092 for example. The flank structure is shifted by an amount, $\Delta\varphi_i$ resulting from the shift in roll position, $\Delta RP_j$, for every flank. The shift follows a predetermined function (e.g. by linear, sinusoidal or higher order functions). The distance from flat to flat (i.e. facet to facet) is the same on every flank.

Case C—Changing the distances of the roll angle increments in the axis position table along a slot (from start-roll position to end-roll position) with and/or without a different function from slot to slot. Teeth 1-3 of a gear are shown as an example. This may be realized by changing Roll Angle increments, $\Delta RP_j$, (e.g. by linear, sinusoidal or higher order functions) between proceeding surface flats. The flats are spaced unequally (i.e. the width of the flats varies) along the tooth and the pattern of flats varies from tooth to tooth. The magnitude of one or more, preferably all, Roll Angle increments, $\Delta RP_j$, is varied which will result in an accompanying variation in the width of the respective flats. The overall pattern of flats on a tooth surface is changed from the pattern formed on an immediate preceding machined tooth surface. In addition, the pattern may be shifted from flank to flank such as via roll position shifting as described in A or B above.

Figure 4:
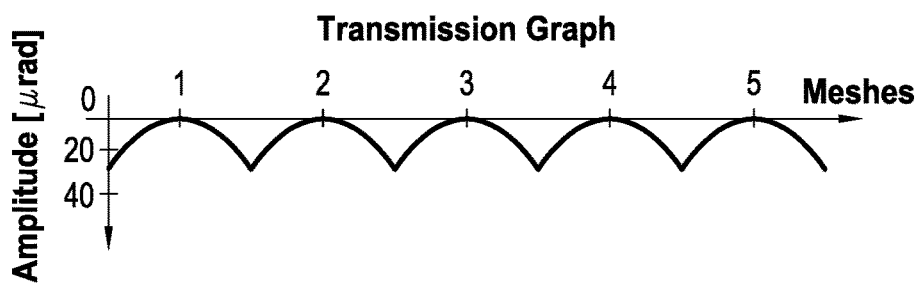
FIG. 4 shows a reference theoretical motion graph (i.e. transmission error) for the drive side of seven teeth from one member of a bevel gear set without any surface structure influence.

FIG. 4 shows a reference theoretical motion graph for the drive side of seven teeth from one member of a bevel gear set without any surface structure influence. The motion graph was obtained as a result of the known single-flank testing (SFT). The parabolas shown represent the motion error from the designed ease-off due to crowning. The amplitude of the transmission error amounts to about 30 μrad.

With single-flank testing, mating gears roll together at their proper center distance with backlash and with only one flank in contact. Utilizing encoders, the single-flank test measures rotational motion (angular displacement error). Data from the encoders is used to establish the motion graph which shows the accuracy or smoothness of rotational motion resulting from the meshing of the gears (known as transmission errors or motion errors).

A low transmission error leading to a low excitation level, by means low motion error amplitudes, is desirable. A certain amount of crowning in profile (i.e. tooth height) and face width (i.e. tooth length) directions on the tooth flanks is required in order to maintain a good contact pattern under high load situations. Crowning is a deviation from conjugate tooth flank surfaces and will cause correlating amplitudes of motion error.

Figure 5:
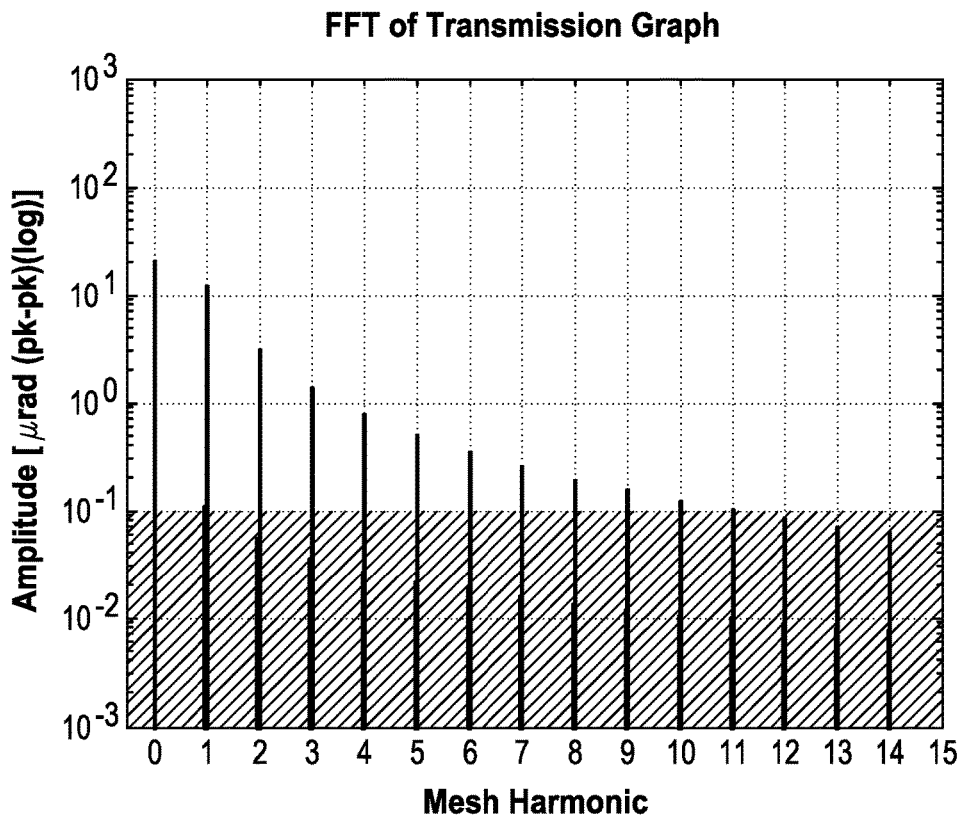
FIG. 5 illustrates a Fast Fourier Transformation (FFT) of the transmission error in FIG. 4.

A Fast Fourier Transformation (FFT) of the transmission error in FIG. 4 leads to the results in FIG. 5. This figure shows the most desired result of a FFT of the single flank test of a gear set showing only an excitation due to the designed motion error without regard to any surface structure influence. The graph shows the amplitude of the transmission error in μrad for the 0 to the $15^{th}$ mesh harmonic. The hatched area shows the results that are usually visually suppressed on a testing machine due to the low amplitudes. Due to the hatched area, the comparability of simulated and measured results is improved.

Figure 6:
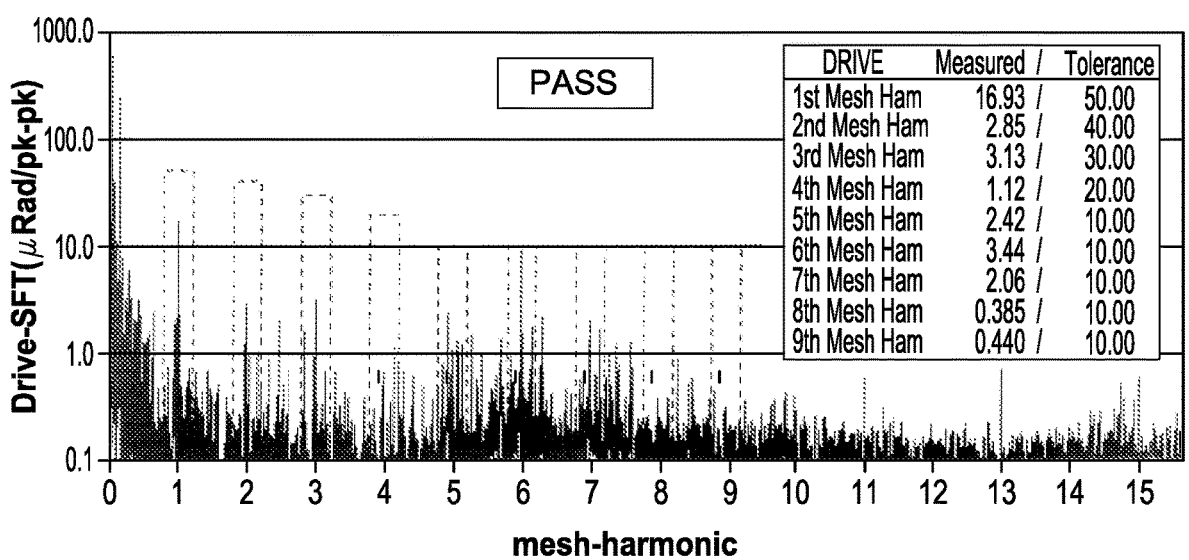
FIG. 6 shows a FFT of a single flank test (SFT) of a measured real gear set.
Figure 7:
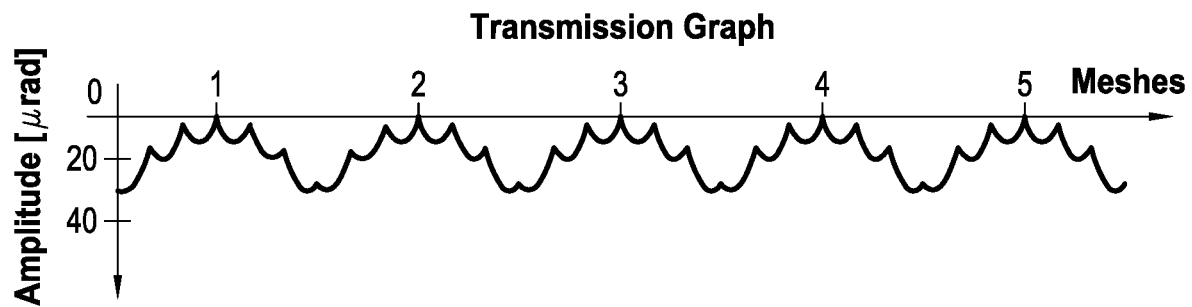
FIG. 7 shows a simulated theoretical motion graph with a purposely introduced surface structure having six grooves introduced per motion error parabola.

The FFT of a single flank test of a measured real gear set in FIG. 6 shows a different behavior than the analysis of the theoretical gearset in FIG. 4, especially in the higher mesh harmonic range. The graph shows the amplitude of the transmission error in μrad for the 0 to the $15^{th}$ mesh harmonic. Occurring mesh harmonics and additional sidebands are visible. The amplitude of the $6^{th}$ mesh harmonic is pronounced, which is not obvious in the analysis of the designed motion-error. In this case, the amplitude of the sixth mesh harmonic is at 9.4 μrad. It is assumed that additional surface structure effects (e.g. waviness which is the surface form (sine wave for example) of a plurality of flats or facets) on the standard ground flank lead to the effects of a higher $6^{th}$ mesh harmonic. To trace back these effects, they are replicated via a simulation with a purposely introduced surface structure (FIG. 7). In this example, six grooves are introduced per motion error parabola. This is done to replicate in the simulation the effects of the high sixth mesh harmonic that can be seen in FIG. 5. The amplitude of the grooves is chosen to deliver results that correlate to the real measurements shown in FIG. 5. In this case the simulated transmission error does not only consist of the designed motion error, but also of a surface structure with a pattern of six grooves per motion error parabola.

Figure 8:
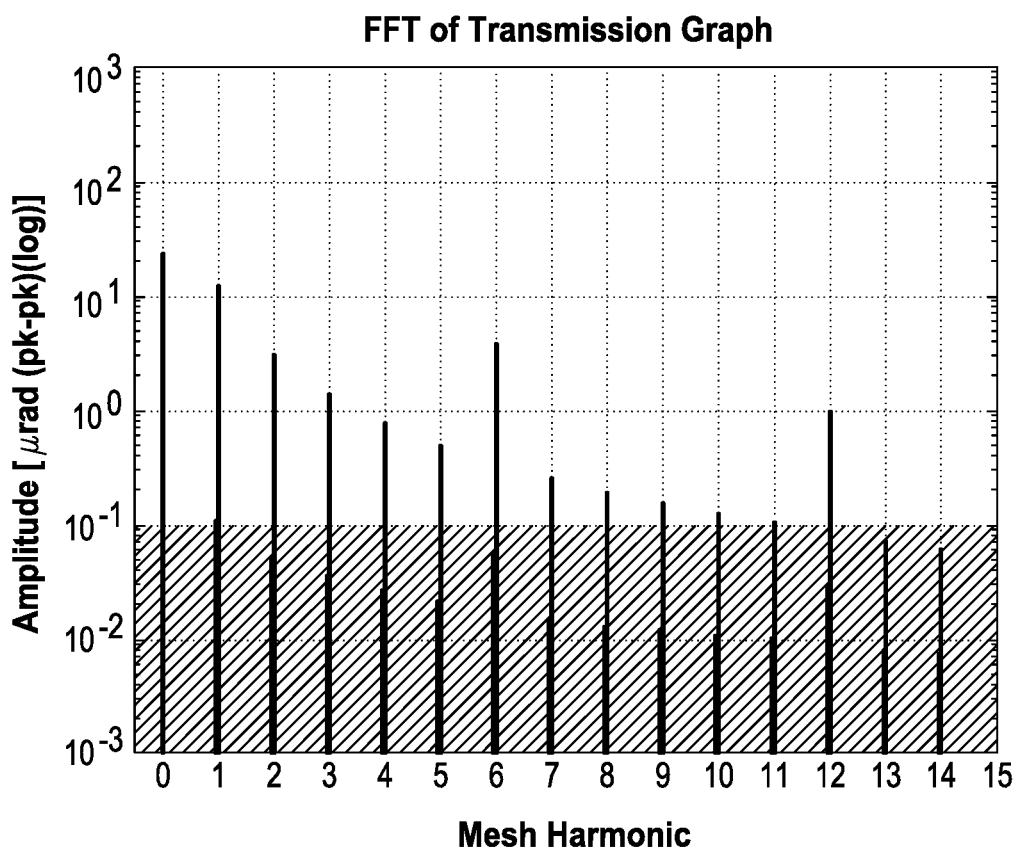
FIG. 8 illustrates a FFT of the transmission error in FIG. 7.

A FFT of the transmission error in FIG. 7 leads to the results in FIG. 8. FIG. 8 shows the result of a FFT of a simulated single flank test of a gear set including an additional surface structure (e.g. waviness) and due to that, an additional excitation of the sixth mesh harmonic, correlating to the measurement of the real gear set. The graph shows the amplitude of the transmission error in μrad for the 0 to the $15^{th}$ mesh harmonic. An increased $6^{th}$ and $12^{th}$ mesh harmonic due to the introduction of the surface waviness is visible. Also, the hatched area represents the results that are usually visually suppressed on a testing machine due to the low amplitudes. The simulation including the surface structure represents a simple model leading to the wanted replication of the effects of a higher $6^{th}$ mesh harmonic measured during a single flank test of the real gear set.

Perhaps the most efficient way to lower the amplified excitations in FIG. 8 would be the elimination or reduction of the effects that take place during the standard grinding process itself. This is desirable but the possibilities are generally limited by the machine stiffness and dynamic behavior in the grinding process.

Other ways to change the excitation behavior are to change several parameters of the standard grinding process. One example is to grind with lower roll rates. If the machine vibrations during grinding are independent from the roll rate and keep their frequency, then the resulting surface structures will become finer. This will lead to a shift of the excitations from lower to higher mesh harmonics.

Excitation problems can occur on both members of the gearset. If one member is already ground in a certain quantity, then counter actions can only be applied to the other member. A purposely introduced waviness to offset for the problems of the opposite member (e.g. US 2014/0256223) in spur or helical gears seems impractical in bevel gear grinding in particular if this requires dressing a waviness structure in the grinding wheel profile. The roll motion in generated pinions and gears and the plunging motion in non-generated gears will not allow transferring of certain grinding wheel profile waves to the flank surfaces. The process-affected relative sliding between grinding wheel profile and flank surfaces would wipe out sinusoidal or similar wave forms with maxima, minima and inflection points. Therefore, the inventive process does not use modifications to the grinding wheel profile, but uses process parameters (roll-positions) with or without additional machine motions to introduce and alter surface structures and is therefore limited to the generated member.

A primary object of the invention is to change and improve the excitation behavior by changing the position of the surface structure (e.g. waviness) on each flank (structure shift), which is fundamentally different from the ideas of unequal tooth spacing that are mentioned in the state of the art. A change of the tooth spacing in a defined or random way will lower the gear quality according to the internationally defined standards. Tooth spacing variations may also cause negative side effects such as low frequency rumbling, which is not the case in the inventive process.

In the case of a structure shift, only the surface structure is addressed in a defined way. Depending on the case, the surface structure in the entire generated flank area is positioned differently e.g. from slot to slot. In all cases this is done via roll-position-shifts and/or roll-increment-changes with or without additional surface structure modifications.

In an example, only a roll-position-shift is utilized without any additional micro-motions (FIG. 3, example A). Flats at high roll-rates can correlate to the lines in the axis-position-table and to the excited mesh harmonics. To improve and change the excitation behavior in these situations the already existing surface structure is shifted on the flank surface.

The objected harmonic is identified via a SFT or similar test (see FIG. 6), possibly using a master gear for the not influenced member. In this example, the objected harmonic is the sixth mesh harmonic.

The shift of the pattern from flank to flank is calculated via the following procedure:

The amount of roll angle per line (RAPL) of the original axis-position table is calculated:

$$RAPL = \frac{\text{(Toe-roll-position)} - \text{(Heel-roll-position)}}{\text{Number of lines in axis-position-table}} \quad (1)$$

For the amount and distribution of shift of the roll-position for each slot ($\Delta RP_j$), a single sine-wave is preferably utilized.

Figure 9:
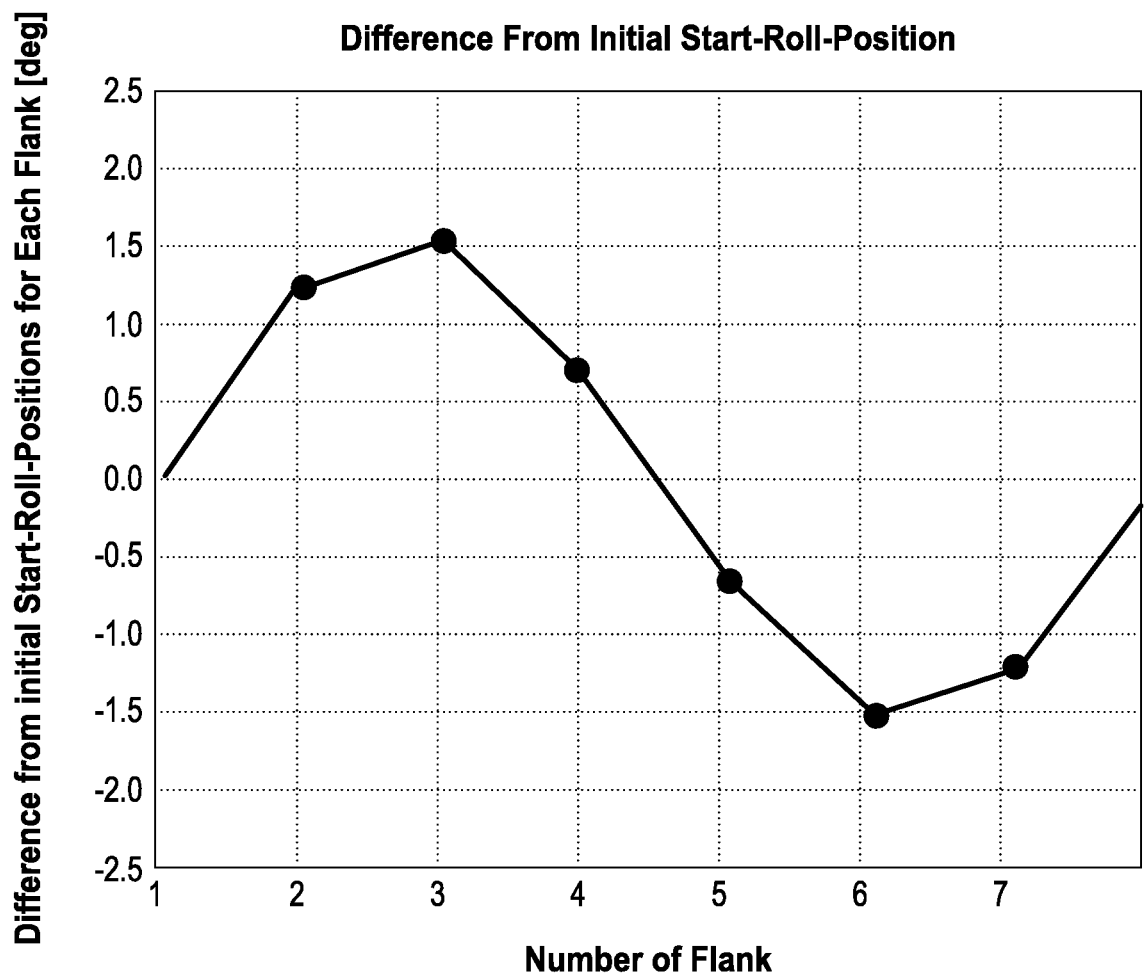
FIG. 9 shows the results of the calculation of change in roll-position (start and end) that change the position of the introduced pattern on every flank in a predetermined way.

The shift-amplitude $A_{SR}$ in roll-position for every slot is calculated via the equation:

$$\Delta RP_{j=i+1} = A_{SR} * \sin\left[\left(\frac{2*\pi}{z_1}\right)*i\right] \quad (2)$$

where:
$A_{SR}$=(shift amplitude)=RAPL
i=0 to ($z_1$−1)
$z_1$=number of teeth of the part The newly calculated $\Delta RP_j$ are added to the toe-(dwell) and heel-(dwell)-roll-positions for every slot, whereas the slot number j=1 has the untouched base-line roll-positions. FIG. 9 shows the results of the calculation of change in roll-position (start and end) that change the position of the introduced pattern on every flank in a predetermined way. The graph shows the sinusoidal arrangement of the shift for every flank. In this case the shift is given for a pinion with 7 teeth.

Shift patterns other than sine waves are also possible. For example, a linear shift with a manually chosen amount of shift for every slot may be utilized. However, regardless of the shift pattern selected, the center-of-roll position remains unchanged.

Figure 10:
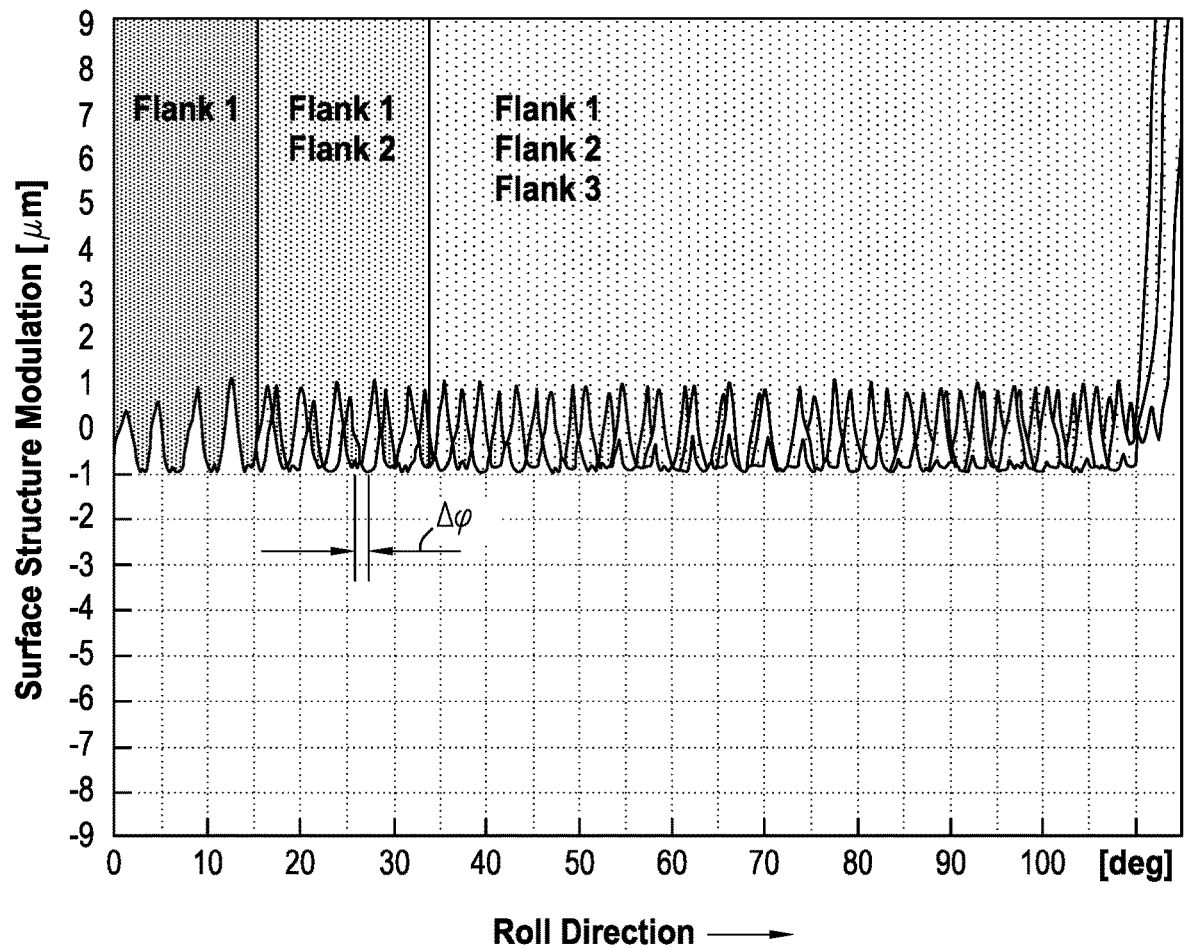
FIG. 10 shows a partial overlay for the surface structure of three tooth flanks shifted by $\Delta\varphi_i$ due to the shifted roll position, $\Delta RP_j$.

The changed roll positions, $\Delta RP_j$, lead to a pattern shift, $\Delta \varphi_i$, for every flank. FIG. 10 shows a pattern shift for three flanks. The different shades of grey represent the material removed during grinding for each flank individually. The simulation shows the shifted relative position of the surface structure for the shown flanks due to an overlay of the first, second and third flank of the ground pinion. A different position of the pattern is visible from flank 1 to flank 2 as well as compared to flank 3. This means when the contact is rolled over the patterns are not in the same position for every flank when choosing the correct amount of amplitude for the shift. The same principle applies to the other flanks but is not shown for better visibility.

Figure 11:
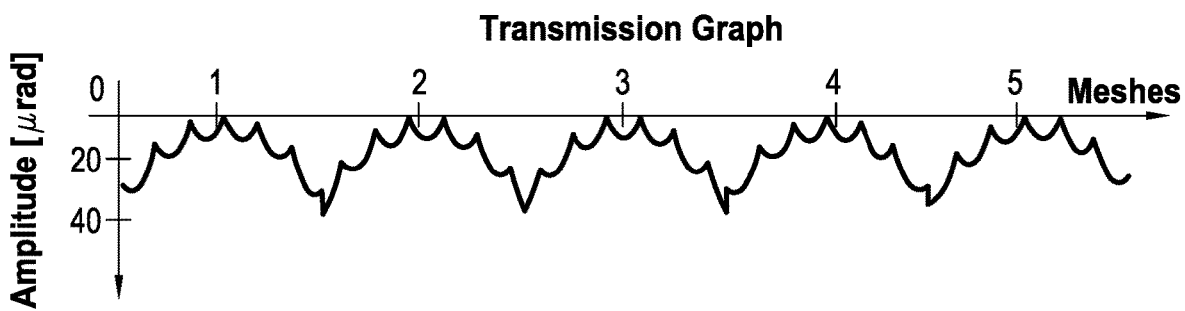
FIG. 11 shows a simulation of the transmission error with purposely introduced surface structure (six grooves are introduced per motion error) in addition to the standard motion error. The surface structure is shifted from flank to flank.

FIG. 11 shows a simulation of the transmission error with purposely introduced surface structure in addition to the standard motion error. In this case six grooves are introduced per motion error. In addition, the surface structure is shifted from flank to flank according to the amounts given in FIG. 9. This is done to predict the effects on the sixth mesh harmonic in the real gear set.

Figure 12:
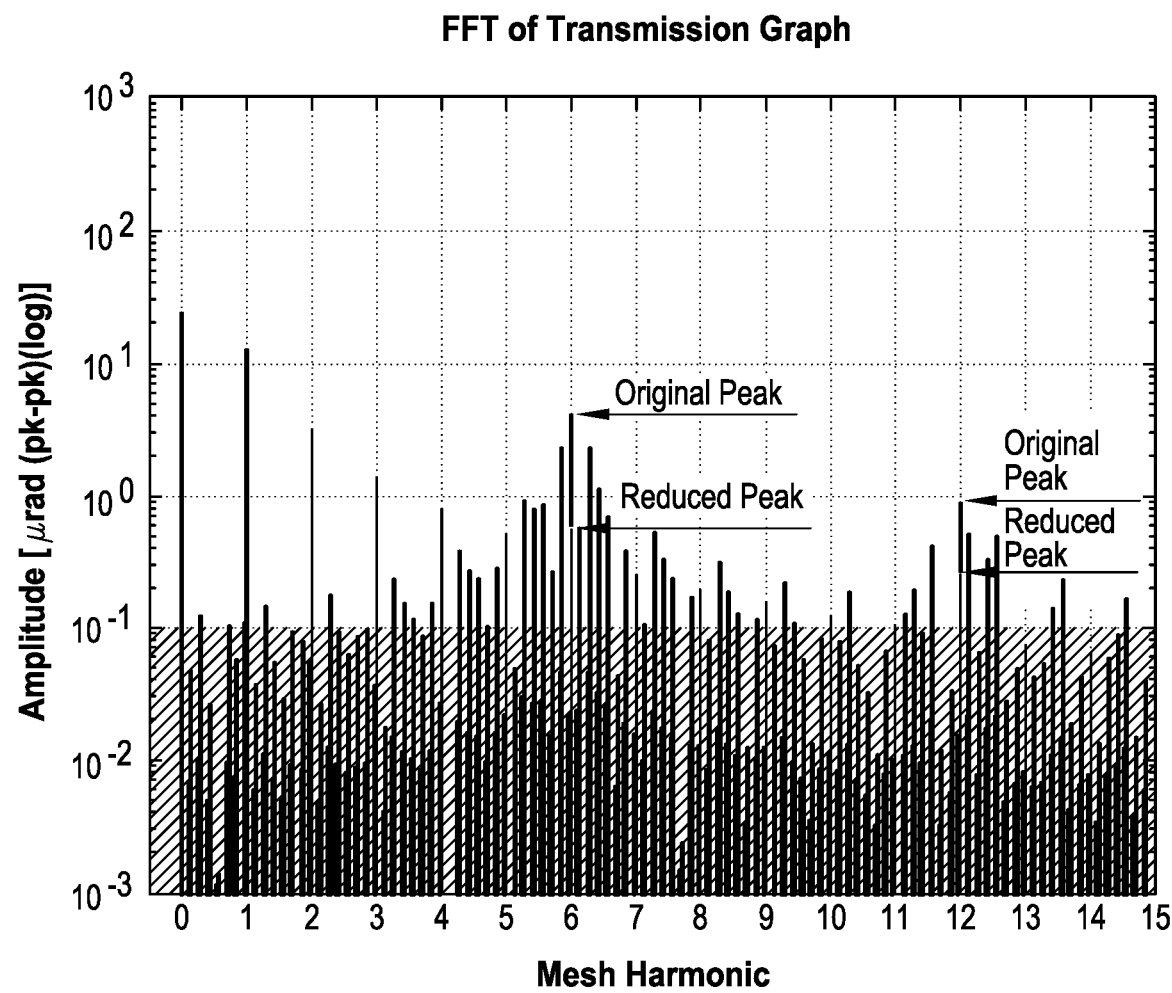
FIG. 12 illustrates a comparison of the simulation with introduced surface structure and no shift (FIG. 8) and that with the shifted surface structure.

A comparison of the simulation with introduced surface structure and no shift and that with the shifted surface structure is shown in FIG. 12. The graph shows the amplitude of the transmission error in μrad for the 0 to $15^{th}$ mesh harmonic. A lowered $6^{th}$ and $12^{th}$ mesh harmonic compared to FIG. 8 due to the introduction of the shifted surface waviness is visible. In addition sidebands are introduced. The hatched area represents the results that are usually visually suppressed on a testing machine due to the low amplitudes.

Figure 13:
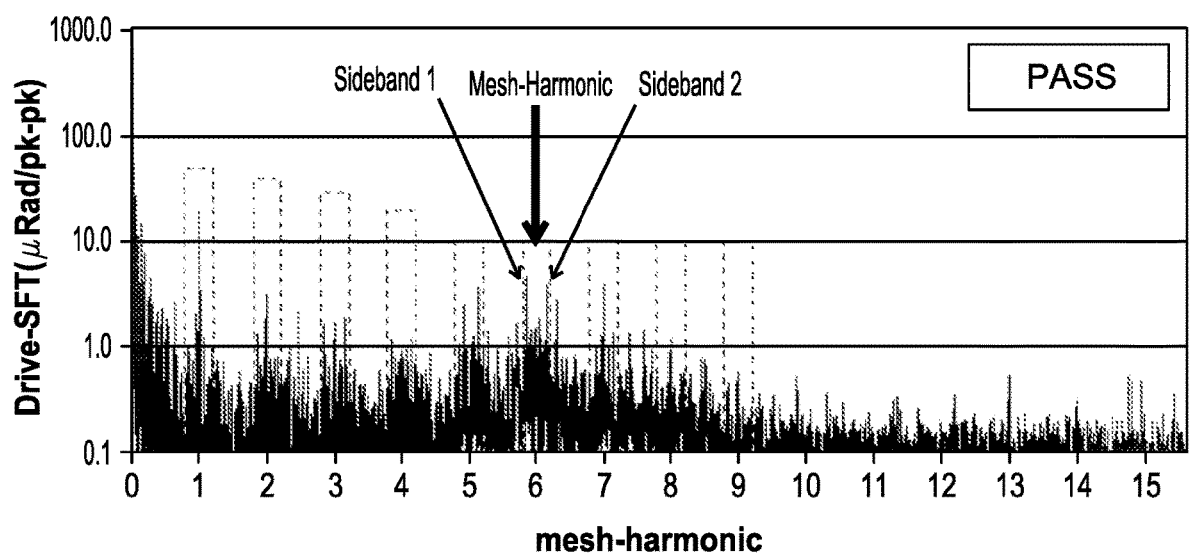
FIG. 13 illustrates a real measured FFT of a Single Flank Test.

The real measured FFT of SFT in FIG. 13 can be compared to the results of the original FFT of the base-line SFT in FIG. 6. The sixth mesh harmonic is significantly lowered and sidebands are introduced. The sidebands 1 and 2 amount to about 4.5 μrad. The effect correlates to the simulated results of the FFT in FIG. 11.

Figure 14:
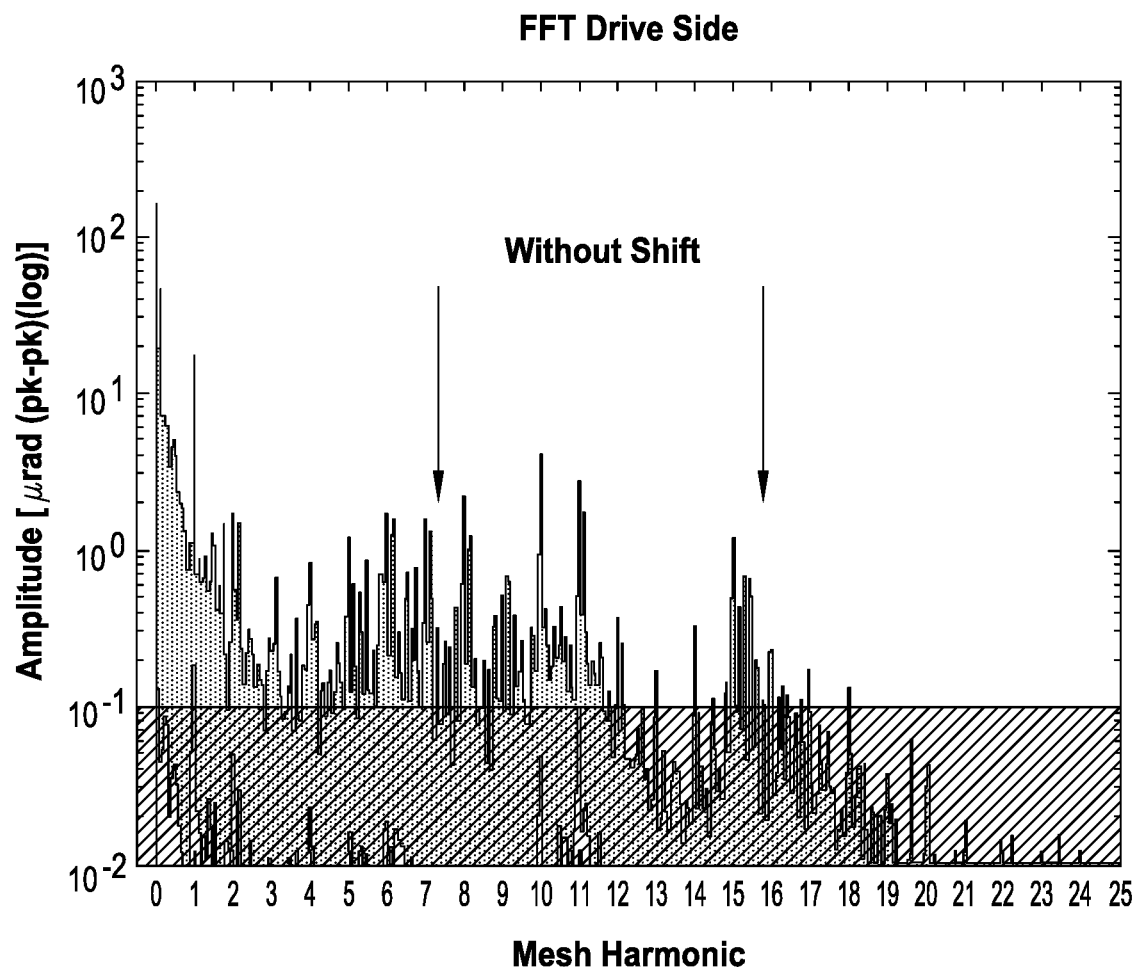
FIG. 14 shows the measured FFT of real SFT ground at a roll-rate of 20°/second without any roll-position-shift.
Figure 15:
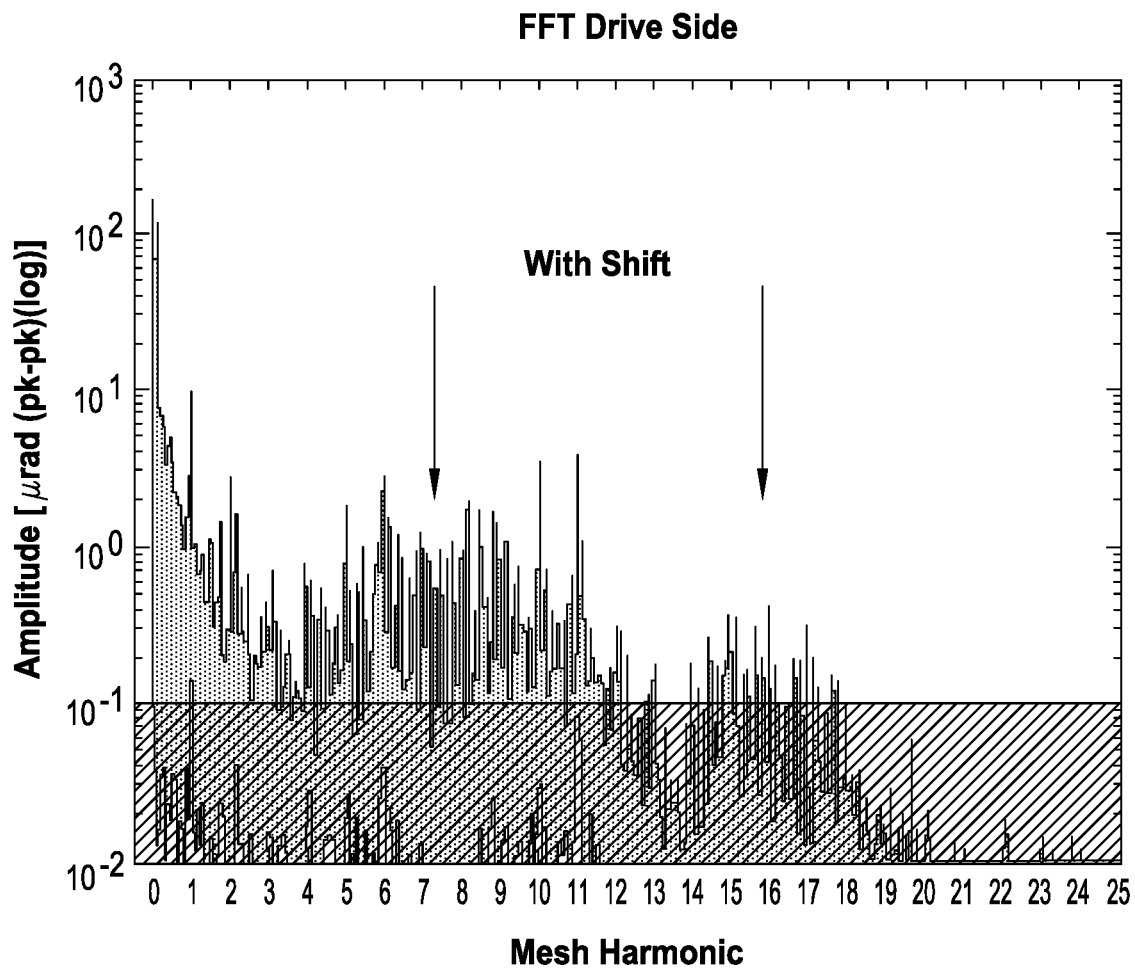
FIG. 15 shows the measured FFT of real SFT ground at a roll-rate of 20°/second with roll-position shift.

In another example, real measured FFTs of SFTs are shown in FIG. 14 and FIG. 15. FIG. 14 shows the measured FFT of real SFT ground at a roll-rate of 20°/second without any roll-position-shift. Every flank is ground the same way, leading to the same surface structure pattern on every flank.

Significant peaks of the mesh harmonics are visible in the area of the 6$^{th}$ to 8$^{th}$ and 14$^{th}$ to 16$^{th}$ mesh harmonics. In addition, peaks can be seen at the 10$^{th}$ and 11$^{th}$ mesh harmonics. The hatched area represents the results that are usually visually suppressed on a testing machine due to the low amplitudes.

FIG. 15 shows the measured FFT of real SFT ground at a roll-rate of 20°/second with roll-position shift. The pattern is shifted from flank to flank. The lowering of peak harmonics in the area of the 7$^{th}$ to 8$^{th}$ mesh harmonic as well as in the area of the 14$^{th}$ to 16$^{th}$ mesh harmonics are visible. In addition sidebands are introduced.

Although the invention has been discussed and illustrated above with respect to the generating process, particularly the generation of bevel pinions by grinding, the invention is not limited thereto. Similar pattern effects may be realized in grinding of non-generated workpieces, such as bevel ring gears for example, particularly when utilizing a grinding wheel motion wherein the axis of the grinding wheel is revolved around an axis parallel to the axis of the grinding wheel. Such a grinding method is commonly referred to as the "Waguri" method (see U.S. Pat. No. 3,127,709). However, the inventors have discovered that by establishing the number of revolutions per minute (RPM) of the revolving motion at a value or values equal to or greater than the grinding wheel RPM, pattern effects such as illustrated by FIG. 10 can be realized.

A change of structure from tooth-to-tooth may be accomplished by changing the RPM of the revolving motion. A phase shift may also be accomplished by an offset angle in the revolving motion rotation which may have a predetermined change from tooth slot-to-tooth slot.

The inventive method is likewise applicable to cutting of bevel gears by generating and non-generating processes, as well as for soft cutting (i.e. non-hardened) conditions and hard cutting (i.e. finishing) conditions such as hard skiving for example. As discussed above, for a certain machining process, machining flats specific to the particular process (e.g. grinding, cutting, etc.) are produced on a gear tooth flank and the invention changes the pattern of machining-specific flats from one tooth flank to another.

In the context of the invention, the term "bevel" gears is understood to be of sufficient scope to include those types of gears known as bevel gears, "hypoid" gears, as well as those gears known as "crown" or "face" gears.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a bevel gear having a plurality of teeth with a rotating tool, said method comprising:
    machining a tooth flank surface of a first tooth to produce a pattern of machining-specific flats on said tooth flank surface,
    machining a tooth flank surface of a next tooth to produce a pattern of machining-specific flats on said tooth flank surface, wherein the pattern of machining-specific flats on the tooth flank surface of said next tooth is different than the pattern of machining-specific flats on the tooth flank surface of said first tooth,
    wherein said machining comprises a generating method.

2. The method of claim 1 further comprising machining a tooth flank surface on each of the remaining teeth of said plurality of teeth of said bevel gear to produce a pattern of machining-specific flats on the tooth flank surface of said each of said remaining teeth, wherein the pattern of machining-specific flats on the tooth flank surface of a respective tooth of said remaining teeth comprises a pattern of machining-specific flats different than the pattern of machining-specific flats on an immediately preceding machined tooth flank surface of said remaining teeth.

3. The method of claim 2 wherein said machining a tooth flank surface comprises engaging said rotating tool and said bevel gear and moving said tool and said bevel gear together in a generating roll which begins at a roll position and extends over a roll angle,
    wherein the roll position for each tooth flank surface of said plurality of teeth is changed from the roll position of an immediately preceding machined tooth flank surface whereby the position of machining-specific flats on a tooth flank surface is shifted relative to the position of machining-specific flats on an immediately preceding machined tooth flank surface.

4. The method of claim 2 wherein said machining a tooth flank surface comprises engaging said rotating tool and said bevel gear and moving said tool and said bevel gear together in a generating roll which begins at a roll position and extends over a roll angle,
    wherein the roll angle for each tooth flank surface of said plurality of teeth comprises a plurality of roll angle increments with the magnitude of each roll angle increment being indicative of a width of a respective machining-specific flat, and
    wherein the roll angle increments vary in magnitude along each tooth flank surface thereby resulting in a corresponding varying of the width of each machining-specific flat along the respective tooth flank surface,
    whereby the varying widths of the machining-specific flats along a tooth flank surface define a pattern and wherein the pattern of varying widths of the machining-specific flats of a tooth flank surface differs from the pattern of varying widths of the machining-specific flats of an immediately preceding machined tooth flank surface.

5. The method of claim 1 further comprising forming a diffuse surface structure on the tooth flank surfaces of said plurality of teeth of said bevel gear.

6. The method of claim 1 wherein said machining comprises grinding.

7. The method of claim 1 wherein said machining comprises cutting.

8. The method of claim 7 wherein said cutting comprises skiving.

9. The method of claim 3 wherein the shifting of the position of machining-specific flats from one tooth flank surface to another follows a predetermined function.

10. The method of claim 9 wherein said predetermined function comprises a linear function, a sinusoidal function or a higher order function).

11. The method of claim 4 wherein the pattern of varying widths of the machining-specific flats from one tooth flank surface to another follows a predetermined function.

12. The method of claim 11 wherein said predetermined function comprises a linear function, a sinusoidal function or a higher order function).

13. The method of claim 1 wherein said rotating tool comprises a grinding wheel rotating about a grinding wheel axis and wherein said grinding wheel axis is further revolved around another axis parallel to said grinding wheel axis, wherein said grinding wheel is rotated about the grinding wheel axis at a first predetermined number of revolutions per minute and said grinding wheel is revolved around said another axis at a second predetermined number of revolutions per minute which is equal to or greater than said first predetermined number of revolutions per minute.

\* \* \* \* \*